(12) United States Patent
Sugawara

(10) Patent No.: US 6,775,434 B2
(45) Date of Patent: Aug. 10, 2004

(54) VARIABLE OPTICAL DISPERSION COMPENSATOR

(75) Inventor: Toshiki Sugawara, Koganei (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/364,502

(22) Filed: Feb. 12, 2003

(65) Prior Publication Data

US 2004/0109637 A1 Jun. 10, 2004

(30) Foreign Application Priority Data

Dec. 10, 2002 (JP) ........................................ 2002-357420

(51) Int. Cl.[7] ............................................... G02B 6/26
(52) U.S. Cl. ........................................ 385/27; 359/124
(58) Field of Search .............................. 385/24, 27, 31, 385/3, 9, 50, 52, 129, 147; 359/124, 130, 127, 161, 568, 569, 550, 298, 297

(56) References Cited

U.S. PATENT DOCUMENTS

| | | | |
|---|---|---|---|
| 6,310,993 B1 * | 10/2001 | Cao et al. ...................... | 385/24 |
| 6,363,184 B2 * | 3/2002 | Cao ............................ | 385/24 |
| 6,659,614 B2 * | 12/2003 | Katayama et al. ........... | 359/846 |
| 2002/0028759 A1 * | 3/2002 | Appel et al. ................. | 510/446 |
| 2002/0093748 A1 * | 7/2002 | Cao et al. .................... | 359/868 |
| 2003/0002772 A1 * | 1/2003 | Katayama et al. ............ | 385/15 |
| 2003/0210911 A1 * | 11/2003 | Takahashi et al. ........... | 398/147 |
| 2004/0027690 A1 * | 2/2004 | Takahashi ................... | 359/726 |

* cited by examiner

Primary Examiner—Akm Enayet Ullah
(74) Attorney, Agent, or Firm—Antonelli, Terry, Stout & Kraus, LLP

(57) ABSTRACT

A dispersion compensator, which has hardly group delay ripples in a broad bandwidth, is applicable for use in a wavelength multiplex transmission system. In an interferometer, the reflection factor of one surface, which is nearly 100%, and a mirror are arranged in parallel or at a slight angle, and light emerging from the first collimator becomes incident on the second collimator after being alternately reflected two or more times between the interferometer and the mirror. An interferometer, in which at least one of the reflection factor or the thickness has been changed in the longitudinal direction, is caused to slide in the longitudinal direction, or the temperature of the interferometer is changed, to thereby make the amount of dispersion variable. These dispersion compensation units cam be provided in a multistage arrangement to realize a variable dispersion compensator which has hardly any group delay ripples in a broad bandwidth.

18 Claims, 16 Drawing Sheets

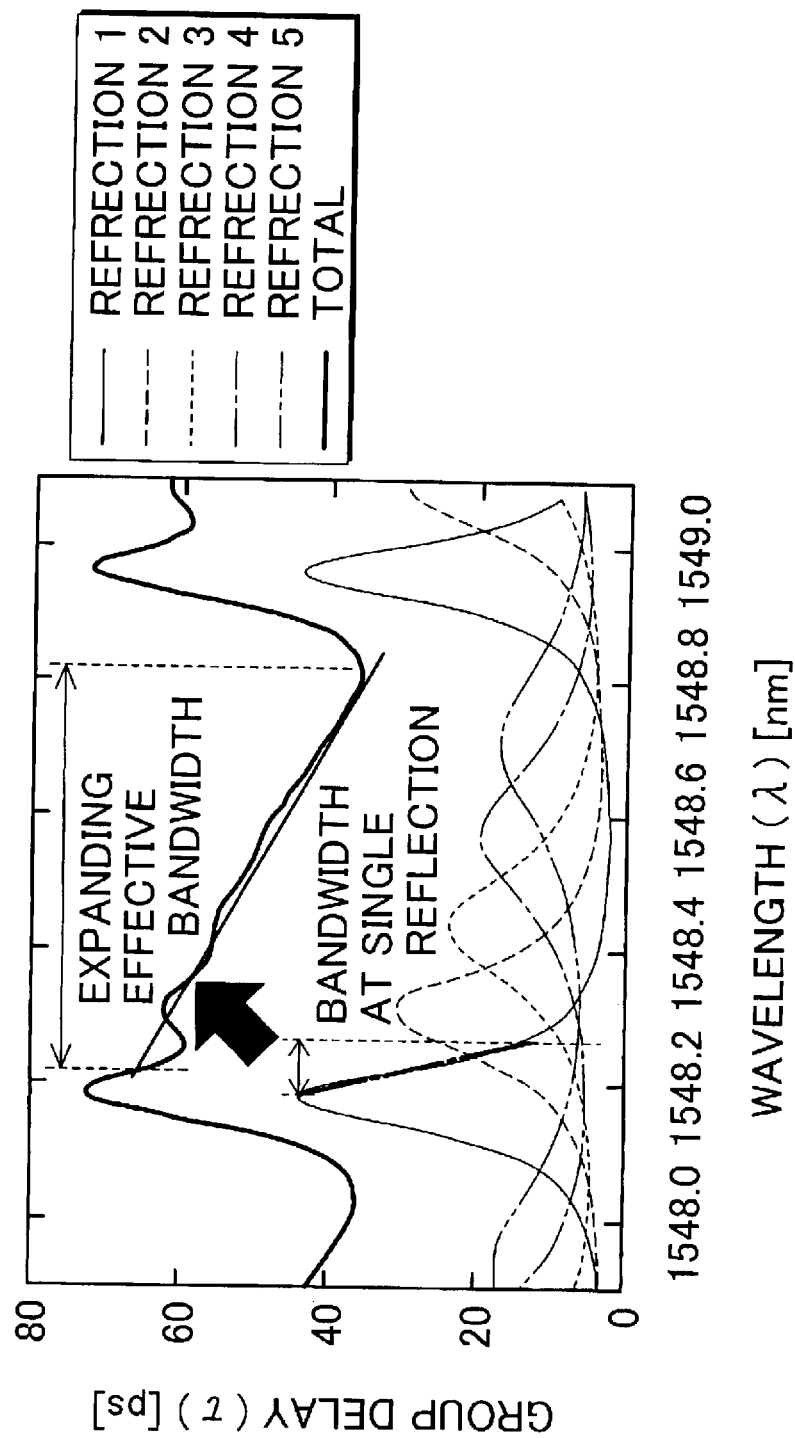

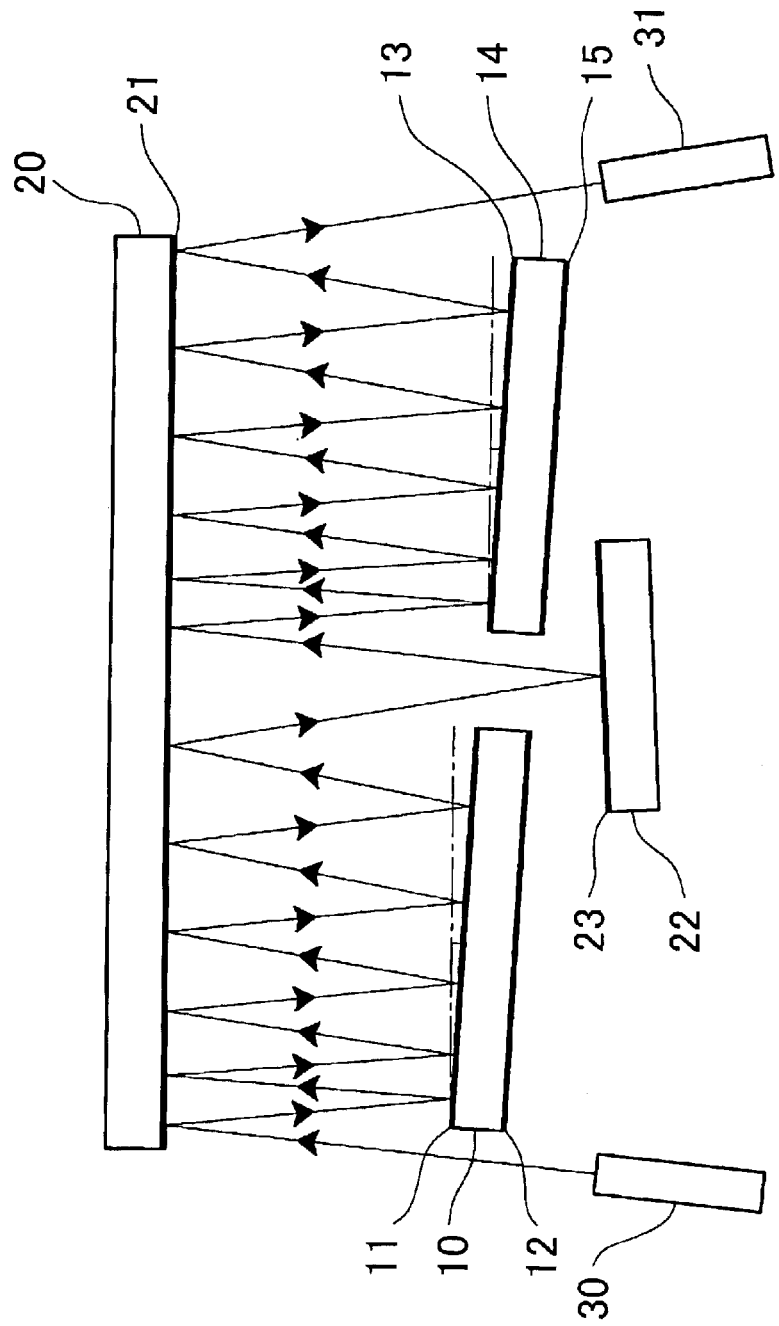

VARIABLE OPTICAL DISPERSION COMPENSATOR

BACKGROUND OF THE INVENTION

The present invention relates to an optical dispersion compensator that is suitable for application in an optical transmission system using optical fibers, or in a system in which an optical transmission scheme based on wavelength multiplexing has been adopted.

In recent years, there has been increased activity in the study and commercialization of a long distance optical transmission system, in which an optical amplifier is used as a repeater. In order to cope with multi-media service, with a particular emphasis on the internet, a trend toward larger capacity with use of WDM (Wavelength Division Multiplex) for multiplexing multiple light signals having different wavelengths to one piece of optical fiber, which serves as a communication transmission path, has been considered as an effective technique. In such a long distance optical transmission system, the transmission speed or transmission distance is restricted to a large extent by a phenomenon referred to as the wavelength dispersion of the optical fiber.

Wavelength dispersion is a phenomenon in which light having different wavelengths propagates through an optical fiber at different speeds. Since the optical spectrum of an optical signal that is modulated at high speeds includes different wavelength components, these components reach a receiver at different times under the influence of wavelength dispersion when propagating through optical fibers. As a result, distortion occurs in the optical signal waveform that is received after optical fiber transmission.

In order to suppress the generation of waveform degradation as a result of such dispersion, a technique referred to as dispersion compensation has been employed. Dispersion compensation is a technique for canceling out the wavelength dispersion characteristic of the optical fibers, so as to prevent the waveform from being degraded, by arranging an optical element, which has the inverse of the wavelength dispersion characteristic of the optical fibers being used as the transmission path, in an optical transmitter, a receiver, a repeater or the like. As an optical element, that is, a dispersion compensator, devices having an inverted dispersion characteristic, such as dispersion compensation fibers and an optical fiber Bragg grating, have been studied and commercialized.

The dispersion tolerance represents a range of residual dispersion (total sum of amounts of dispersion by transmission path fibers and the dispersion compensator) that satisfies a certain reference of transmission quality. Since the dispersion tolerance becomes smaller inversely with the square of the bit rate of an optical signal, the dispersion compensation technique becomes even more important as the transmission speed rises. For example, in a 10 Gbps transmission system, when it is considered that the dispersion tolerance of the optical signal is nearly 1000 ps/nm, and that the amount of dispersion of a single mode fiber is about 17 ps/nm/km, the system will be able to transmit only about 60 km without the aid of the dispersion compensation technique. On the other hand, the dispersion tolerance in a 40 Gbps transmission is about 60 ps/nm, that corresponds to $\frac{1}{16}$, and this corresponds to about 4 km in a single mode fiber.

At present, since the transmission distance of the main line stem optical fiber transmission using an optical repeater is from several tens of kilometers to about thousands of kilometers, it is necessary to select the amount of dispersion of the dispersion compensator in accordance with the transmission distance. For example, in a 10 Gbps transmission system, a method has been adopted in which a dispersion compensator having a fixed amount of compensation in increments of 100 ps to about several hundreds ps is provided in advance in consideration of the dispersion tolerance, and the amount of compensation is determined in accordance with the transmission distance at the time of installation for the given installation, or the like. In this case, for a dispersion compensator, there is adopted a representative method for using a dispersion compensation fiber having wavelength dispersion with an inverse symbol relative to the transmission path.

In a 40 Gbps transmission system, a dispersion compensator whose amount of compensation dispersion is capable of varying in increments of 10 ps to about several tens of ps similarly is considered necessary. Moreover, in this case, variations in the amount of wavelength dispersion due to the temperature of the transmission path fibers cannot be ignored. For this reason, a dispersion compensator that is capable of controlling the amount of dispersion in a variable manner has become necessary.

However, these conventional dispersion compensators also have various problems. When dispersion compensating by a fixed amount, since huge compensation fibers as long as several kilometers to hundreds of kilometers are required for the dispersion compensation, the required storage space for the fibers becomes large. Also, in order to compensate for signal losses in the dispersion compensation fibers, there is the possibility that extra light amplifiers will be required. Further, the dispersion compensation fibers generally have a small mode field diameter, and there is the possibility that they cause a great fiber non-linear effect and distortion of the transmission waveform.

In the case of an optical fiber Bragg grating, the compensation characteristic greatly changes depending upon a slight change in the wavelength because ripples exist on the wavelength in the transmission characteristic and the wavelength dispersion characteristic. Accordingly, it is known that the transmission characteristic thereof, when used for dispersion compensation, is inferior to that of the dispersion compensation fibers. Also, those having a large amount of dispersion and a large wavelength bandwidth are difficult to fabricate from a production viewpoint, and there is a problem that those having a narrow bandwidth require stabilization in both temperature and wavelength. Also, in the dispersion compensation fibers, the amount of dispersion cannot be continuously made variable in principle, and so it is difficult to realize such a variable dispersion compensation, since the amount of dispersion is being continuously changed in accordance with the change in the amount of dispersion in the transmission path.

SUMMARY OF THE INVENTION

In the case of an optical fiber Bragg grating, as a method of realizing continuous variable dispersion compensation, there has been reported, for example, a method for producing a chirped grating by giving a temperature gradient in the longitudinal direction of the optical fiber Bragg grating for effecting dispersion compensation transmission. In this case, by controlling the temperature gradient, it becomes possible to dispersion compensate for a variable amount. However, this method makes it difficult to obtain a uniform temperature gradient, and it has problems in that a sufficient dispersion compensation of performance cannot be attained, such as due to ripples occurring in the wavelength dispersion. This poses a problem in actual practice.

Therefore, it is an object of the present invention to solve such problems as described above and to provide a dispersion compensator which has hardly any ripples in the broad bandwidth.

The structure is arranged such that an interferometer, the reflection factor of one surface of which is nearly 100%, and a mirror are arranged in parallel or at a slight angle, whereby light emerging from the first collimator becomes incident on the second collimator after resonance and emission are repeated two or more times by the interferometer. Further, through the use of an interferometer, in which at least one of the reflection factor or the thickness changes in the longitudinal direction, the interferometer is caused to slide or its temperature is changed by a heater or the like, whereby there is provided an arrangement in which the amount of dispersion is variable for the dispersion compensator. Further, these dispersion compensators are provided in a multistage arrangement, whereby it becomes possible to realize a variable dispersion compensator that is applicable to a wavelength multiplex optical transmission system whose ripples have been restrained in the broad bandwidth. A more detailed description of exemplary embodiments will be set forth in the following more detailed description of the present invention.

BRIEF DESCRIPTION OF THE DRAWINGS

FIG. 5 is a graph showing the group delay characteristic of the optical dispersion compensator of FIG. 3;

FIG. 12 is a diagram showing example of the structure of an optical dispersion compensator according to a fifth embodiment of the present invention;

DETAILED DESCRIPTION OF THE PREFERRED EMBODIMENTS

Figure 1:
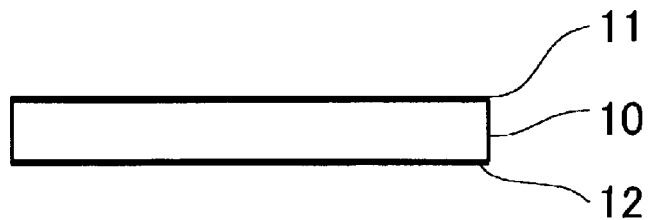
FIG. 1 is a diagram of an interferometer, which may be employed as a basic element of an optical dispersion compensator according to the present invention.

Hereinafter, with reference to the drawings, a detailed description will be provided of various embodiments of the present invention. First, a Gires Toumois (GT) interferometer will be described. FIG. 1 shows the basic structure of this interferometer. The interferometer is obtained by coating both surfaces of a plane plate 10 which have been made precisely parallel with each other, with a reflecting film 11, 12. For the reflecting film, a metal film made of gold, silver or the like, having a high reflection factor, or a dielectric multilayer film or the like, is used. Particularly, an interferometer having a reflection factor on one side of 100% is referred to as a GT interferometer.

In the case of such an interferometer, since its transmission factor is constant irrespective of the wavelength, it is referred to as an all pass filter. As regards phase (group delay time), however, it has wavelength dependence. The group delay time τ in this device is represented by the following expression:

Expression 1

$$\tau = \frac{\Delta L(1 - r^2)}{1 + r^2 + 2r\cos(\omega \Delta T + \phi_0)}$$

where τ is an amplitude reflection factor, ω is each frequency of light, $\phi_0$ is an optical phase change caused in the reflected film, and ΔL is an optical distance, both going and returning, along the parallel plane plate.

Figure 2:
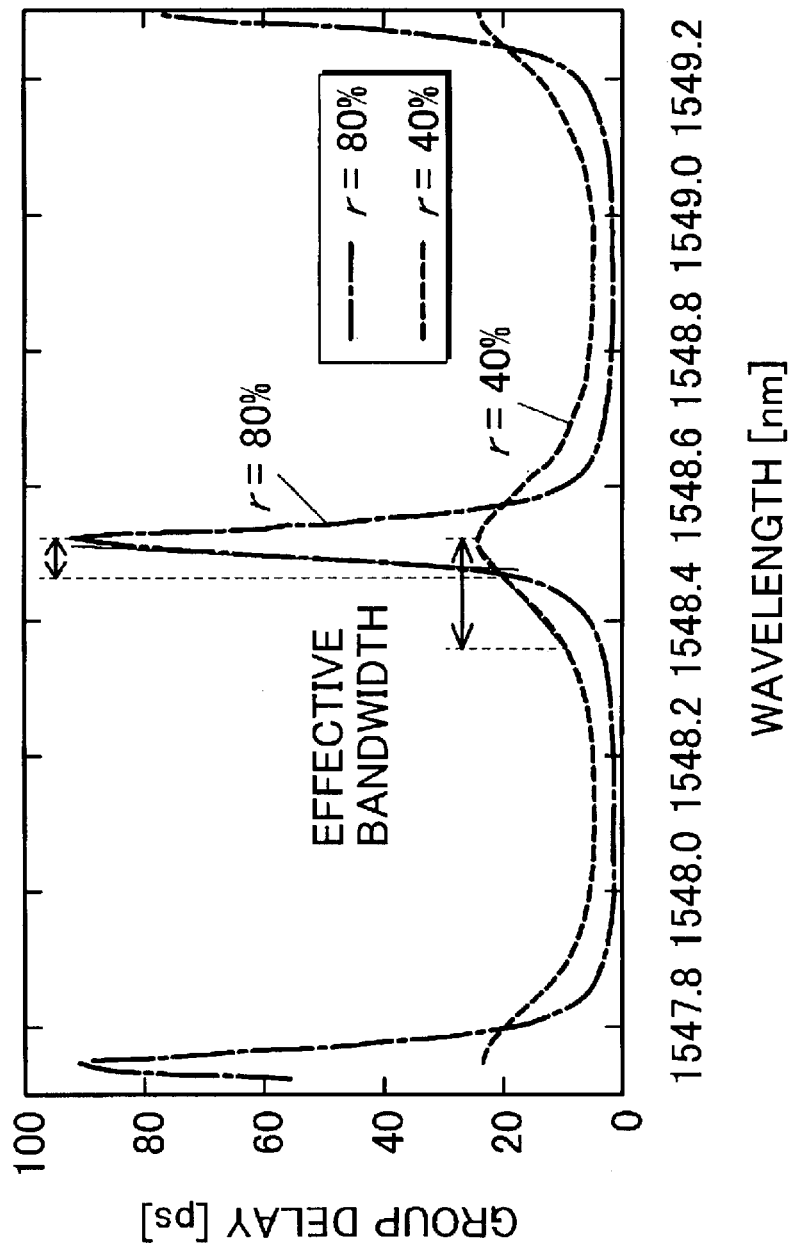
FIG. 2 is a graph showing a group delay characteristic of an interferometer.

FIG. 2 shows group delay characteristics when the amplitude reflection factor τ is set to 80% and 40%. The wavelength dispersion D is obtained by differentiating the group delay time τ with respect to the wavelength.

Expression 2

$$D = \frac{d\tau}{d\lambda}$$

This is equal to the inclination of the curve of FIG. 2. When dispersion of a higher order (referred to also as wavelength differentiation of dispersion or dispersion slope) is ignored, the variable dispersion compensator has preferably as flat a characteristic as possible. In other words, a place where the inclination shown in FIG. 2 is linear within as wide a range as possible can be used, and this portion will be referred to as an effective bandwidth. It can be seen that, in the case of a higher reflection factor than this (r=80%), the effective bandwidth becomes narrower, although the amount of dispersion (the inclination in the figure) is large; while, in the case of a lower reflection factor (r=40%), the effective bandwidth becomes wider, although the amount of dispersion is small.

Figure 3:
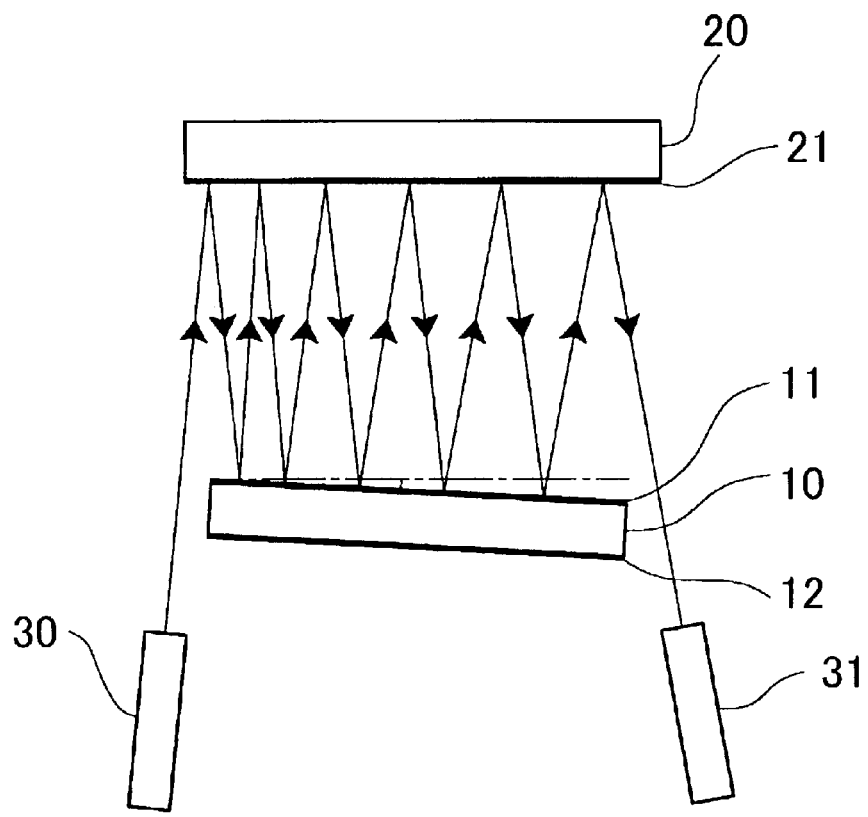
FIG. 3 is a diagram showing the use of an optical dispersion compensator according to the present invention.

In a dispersion compensator, particularly in a 40 Gbps long distance optical transmission system, however, it becomes important for a high-speed signal that the effective bandwidth is broad (40 GHz or higher), and that a large variable range can be taken. A method is proposed for expanding the effective bandwidth with a few optical parts by reflecting light two or more times through the use of a mirror. With reference to FIG. 3, the basic structure of a dispersion compensator according to the present invention will be described. A mirror 20 is arranged in parallel with or at a slight angle with respect to the interferometer. More specifically, the mirror 20 is obtained by coating one side of a substrate with a reflecting film 21 having a high reflection factor.

Figure 4:
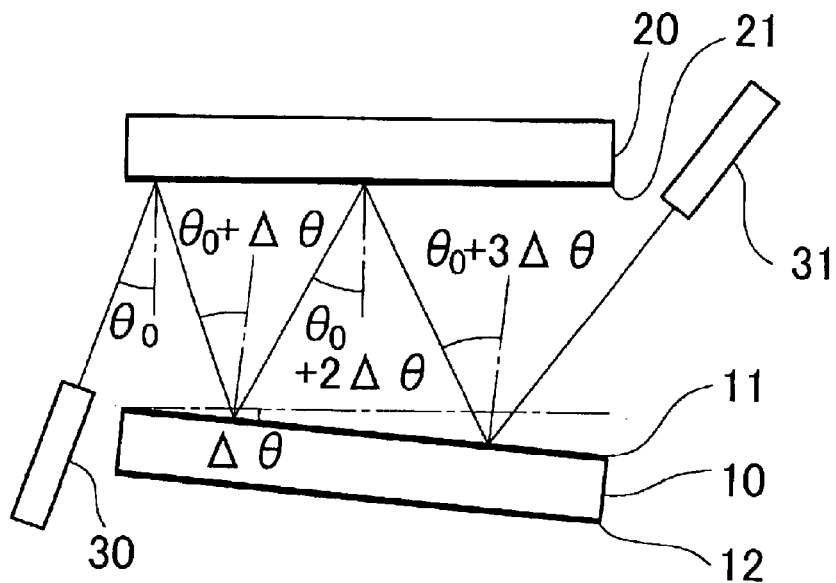
FIG. 4 is a diagram illustrating in more detail the operation of the optical dispersion compensator of FIG. 3.

In order to explain in more detail the group delay characteristic of this dispersion compensator using a mathematical expression, reference will be made to FIG. 4. A collimator 30 is arranged at an angle of incidence of $\theta_0$ that is slightly oblique from the vertical direction with respect to the mirror 20. The collimator is an optical part which emits light for propagation through an optical fiber into the space as a parallel beam. Light emerging from the collimator 30 is reflected by a mirror surface 21, emerges after resonating with the interferometer (10, 11, 12), and after these processes are repeated two or more times, becomes incident on the collimator 31. At this time, when the positional relationship between the interferometer (10, 11, 12) and the mirror 20 is such that an angle $\Delta\theta$ is established from the parallel, the angle of incidence $\theta$ with respect to the interferometer becomes $\theta=\theta_0+\theta$, $\theta_0+3\Delta\theta$, .... When the angle of incidence with respect to the interferometer becomes large, the optical path length which resonates also becomes large, the peak of the group delay is shifted to the long wavelength side, and, at the same time, the reflection factor also becomes lower. When the total group delay characteristic $\iota_{total}$ is enciphered, it is represented as follows:

Expression 3

$$= \sum_{i=1}^{k} \left[ \begin{array}{c} \tau_{total} = \sum_{i=1}^{k} \tau_i \\ \frac{\Delta L(1 - r_i)}{1 + r_i^2 + 2r_i \cos(\omega \Delta L + \phi_0)} \end{array} \right]$$

Expression 4

$$\Delta L = \frac{2nL}{c \cos\Theta}$$

where $\Theta$ is an angle of incidence in the interferometer, and it is represented by n sin $\Theta$=sin $\theta$.

FIG. 5 shows the group delay characteristic at each reflection and their total $\iota_{total}$, that is, the group delay characteristic in the structure shown in FIG. 3. Although the dispersion is represented by wavelength differentiation of the group delay, it can be seen that the structure proposed can be expanded, rather than the effective bandwidth, so as to be given by a single resonance; that is, such an interferometer may be provided as a single unit, as shown in FIG. 6.

Figure 6:
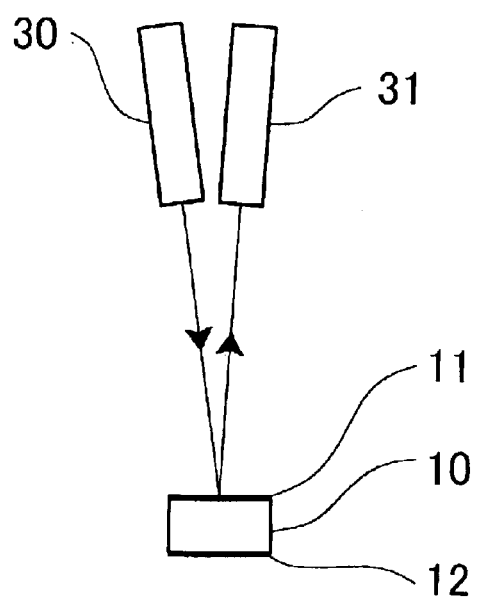
FIG. 6 is a diagram showing a basic structure using an interferometer as a basic element of an optical dispersion compensator according to the present invention.

In the structure shown in FIG. 6, the optical dispersion compensator is composed of: collimators 30 and 31; a plane plate 10; and reflecting films 11 and 12. An optical beam emerging from the collimator 30 resonates only once, with an interferometer composed of the plane plate 10 and the reflecting films 11 and 12, and, thereafter, it becomes incident on the collimator 31. FIGS. 3 and 5 show a case of $\Delta\theta\neq0$, but here we can safely say that $\Delta\theta=0$. In this case, since there is no effect of the peak wavelength of the group delay being shifted, the amount of dispersion can be large, although the bandwidth is not expanded. Thereby, it becomes possible to design a dispersion compensator having an arbitrary amount of dispersion or bandwidth. Thus, it becomes possible to expand the bandwidth of the dispersion compensator and to restrain ripples.

Figure 7:
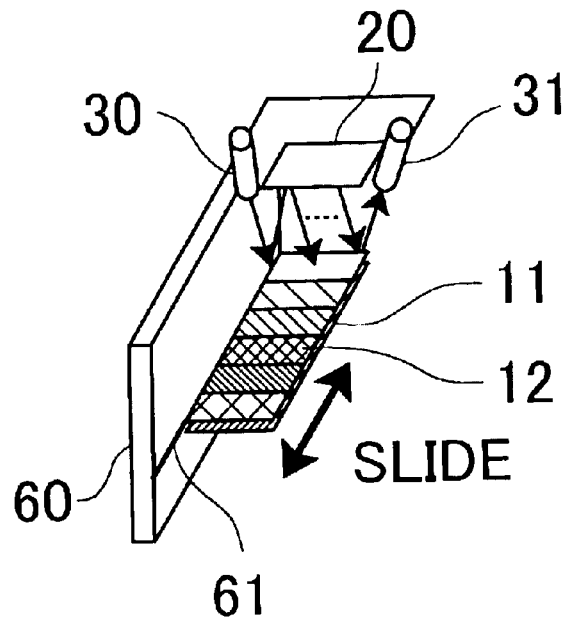
FIG. 7 is a diagrammatic perspective view of an optical variable dispersion compensator according to a first embodiment of the present invention.

A method for making the amount of dispersion compensation variable on the basis of this method is shown in FIG. 7. In this case, a GT interferometer is used, in which a different group delay characteristic can be obtained by varying the reflection factor and thickness in the longitudinal direction. In the GT interferometer (11, 12), the reflection factor of the reflecting film 12 is as high (100% ideally) as possible, and the reflection factor of the reflecting film 11 varies in the longitudinal direction. As regards a method for varying the reflection factor, a method for changing the thickness of the coating, a method for changing the composition of the coating little by little, and the like, are available.

By sliding the GT interferometer (11, 12) in a direction in which the reflection factor varies, as described above, a mechanism can be provided for making the amount of dispersion compensation variable. In order to slide the GT interferometer, a fixed base 60 is provided with a guide rail 61, which guides the base 60 in a direction in which the GT interferometer (11, 12) operates. Also, the fixed base 60 fixes the collimator 30, 31 and the reflecting film 21. In order that a beam emerging from the collimator 30 becomes incident on the collimator 31, the GT interferometer (11, 12) is slidable along the guide rail 61 by means, such as a stepping motor, without changing the direction of the beam.

Figure 8:
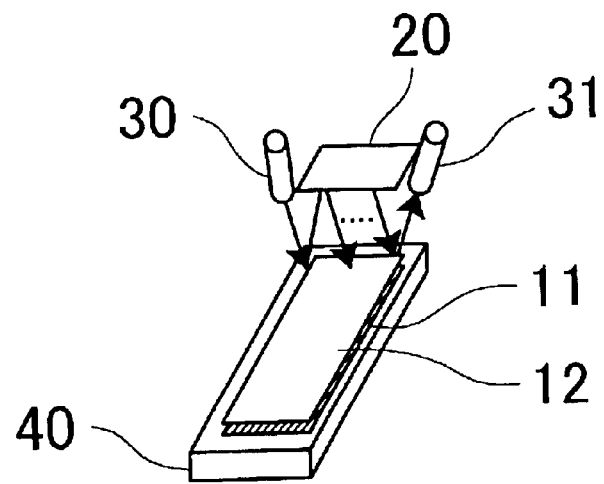
FIG. 8 is a diagrammatic perspective view of an optical variable dispersion compensator according to a second embodiment of the present invention.

As another method of providing a variable mechanism, it is also conceivable to change the temperature of the interferameter by adding a heater 40, as shown in FIG. 8. In this case, the coefficient of thermal expansion of the interferometer substrate changes and the wavelength that resonates slightly changes. This corresponds to a shift of the peak wavelength of the group delay, as shown in FIGS. 2 and 5. As a matter of course, as a variable mechanism, both a method for sliding the interferameter and a method involving the use of a heater may be combined. In this respect, the dispersion compensator using such a GT interferometer shows wavelength dependence in terms of group delay and dispersion characteristic. This period is referred to as the Free Spectral Range (FSR) and is 100 GHz (about 0.8 nm) in this figure. It becomes particularly effective in wavelength multiplex transmission to have such a wavelength periodicity. If the FSR is made equal to a wavelength space during wavelength multiplex transmission, the GT interferometer will be able to give similar effects with respect to signals with all wavelengths. Accordingly, such a variable dispersion compensator is exceedingly effective in a wavelength multiplex transmission system.

Figure 9:
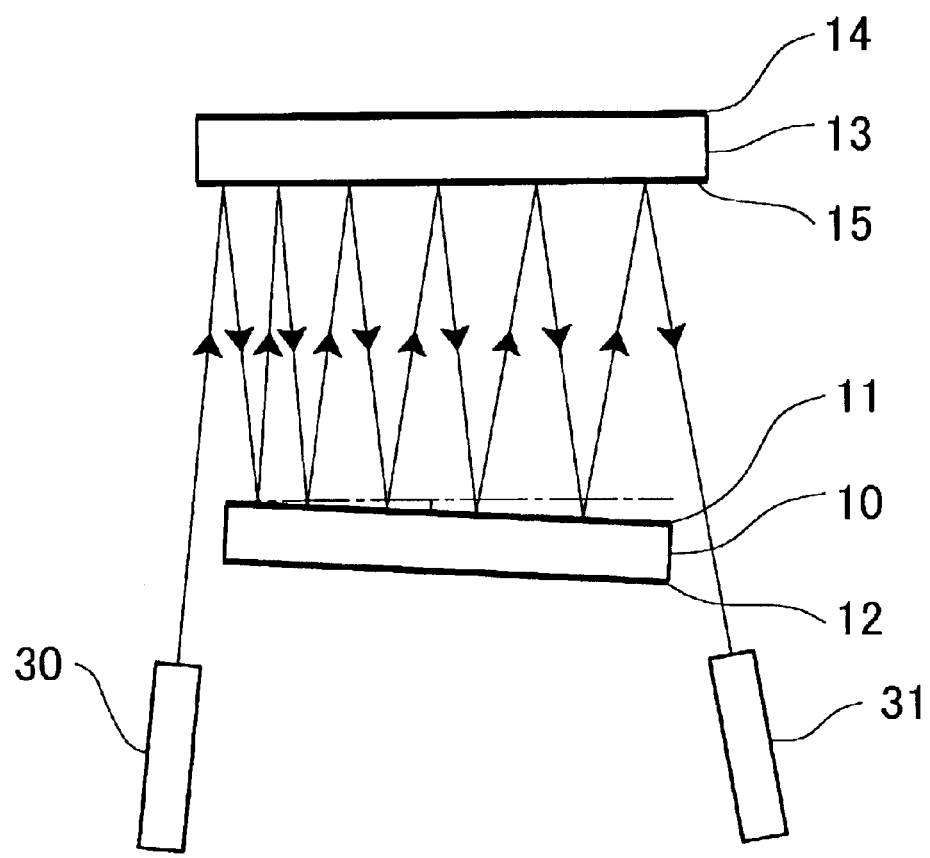
FIG. 9 is a diagram showing an optical dispersion compensator according to a third embodiment of the present invention.

Further, as a method for expanding the bandwidth and restraining ripples, it is conceivable to combine GT interferometers having two or more kinds of different reflection factors for reflection. An example of the structure for this arrangement is shown in FIG. 9, and the structure is such that a second GT interferometer (13, 14, 15) is provided in place of the mirror (20, 21) in FIG. 3. The variable dispersion compensator of FIG. 9 is composed of: collimators 30 and 31; a first GT interferometer consisting of a plane plate 10 and reflecting films 11 and 12; and a second GT interferometer consisting of a plane plate 13 and reflecting films 14 and 15. An optical beam emerging from the collimator 30 becomes incident on the collimator 31 after resonation and emission are alternately repeated by the two GT interferometers several times. In this figure, the first GT interferometer (10, 11, 12) and the second GT interferometer (13, 14, 15) have been arranged to oppose each other at a slight angle, but it may be possible to cause these elements to oppose each other in parallel, as described above. When they are arranged at a slight angle, as described above, the optical beam emerging from the collimator 30 repeats resonance while changing the angle of incidence on the GT interferometer little by little, as shown. Thereby, a dispersion compensator which has hardly any group delay ripples in the broad bandwidth, as described above, can be realized.

Figure 10:
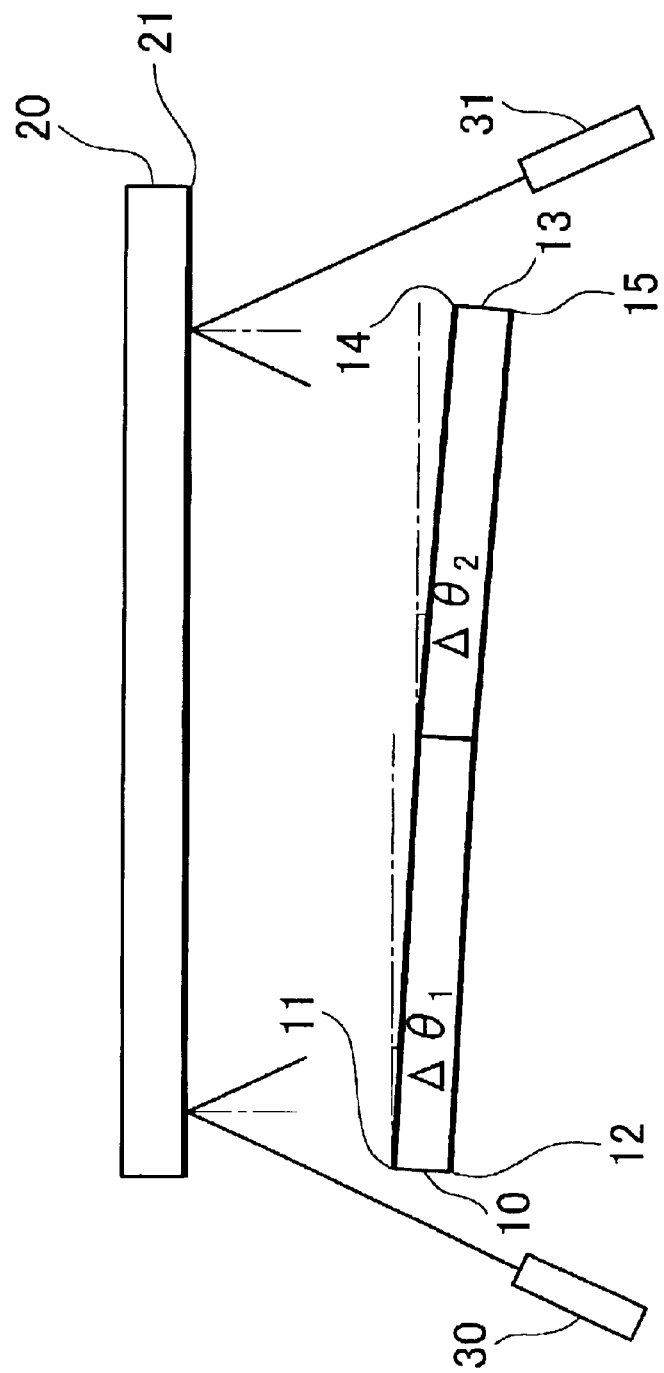
FIG. 10 is a diagram showing an optical dispersion compensator according to a fourth embodiment of the present invention.

Also, another structure, in which two types of GT interferometers are arranged side-by-side, is shown in FIG. 10. In this structure, two types of GT interferometers (10, 11, 12) and (13, 14, 15) have been arranged at an angle $\Delta\theta_1$ and $\Delta\theta_2$, respectively, from the parallel with respect to the mirror (20, 21). By doing so, it is possible to independently set the position of the peak that occurs in those two GT interferometers and a change in the reflection factor, and to further enlarge the degree of freedom of design concerning the expanding bandwidth, ripples and the amount of dispersion.

The variable dispersion compensator shown in FIG. 10 is composed of: collimators 30 and 31; a first GT interferometer consisting of a plane plate 10 and reflecting films 11 and 12; a second GT interferometer consisting of a plane plate 13 and reflecting films 14 and 15; and a mirror consisting of a substrate 20 and a reflecting film 21. The optical beam emerging from the collimator 30 resonates with the first GT interferometer for emission and is reflected by the mirror.

After this process is repeated several times, the optical beam becomes incident on the collimator 31. In this figure, the first GT interferometer (10, 11, 12), the second GT interferometer (13, 14, 15) and the mirror (20, 21) have been arranged to oppose each other with a slight angle, but it may be possible to arrange these elements to oppose each other in parallel, as described above. When arranged at a slight angle, as described above, the optical beam emerging from the collimator 30 repeats resonance while changing the angle of incidence on those two GT interferometers little by little, as shown. Thereby, a dispersion compensator which has hardly any group delay ripples in the broad bandwidth can be realized.

Figure 11:
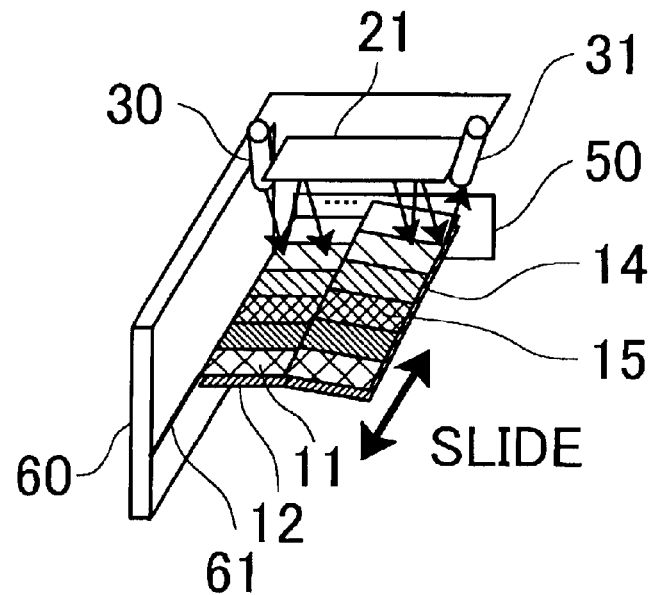
FIG. 11 is a diagrammatic perspective view showing an example of the structure of an optical variable dispersion compensator according to the fourth embodiment of the present invention.

Next, an example of a structure for providing a variable mechanism, based on the concept of FIG. 10, is shown in FIG. 11. The variable dispersion compensator of FIG. 11 is composed of: collimators 30 and 31; a first GT interferometer consisting of reflecting films 11 and 12; a second GT interferometer consisting of reflecting films 13 and 14; a fixed base 50 for fixing those two interferometers; a mirror consisting of a reflecting film 21; and a fixed base 60 having a guide rail 61. In this case, the reflecting films 11 and 13 have a varying reflection factor in a direction (here, referred to as a longitudinal direction) perpendicular to a direction at which the optical beam emerging from the collimator 30 advances, as indicated by light and shade hatching in the figure, while repeating resonance and reflection with the mirror and those two interferometers. The two GT interferometers have their angles fixed by the fixed base 50, and they are slidable at the same time in the direction indicated in the figure, whereby the amount of dispersion compensation can be made variable.

In order to allow these elements to slide, the fixed base 60 has a guide rail 61 to guide them in a direction in which the two GT interferometers operate. Also, the fixed base 60 fixes the collimators 30, 31 and the reflecting film 21. In order that a beam emerging from the collimator 30 becomes incident on the collimator 31, the two GT interferometers are capable of being moved along the guide rail 61 by means such as a stepping motor without changing the direction of the beam. With such a structure, the variable mechanism of a dispersion compensator which has hardly any group delay ripples in the broad bandwidth can be realized.

In the case of the above-described structure, however, the peak wavelength of the group delay, which the two types of GT interferometers have, must satisfy the broad bandwidth dispersion characteristic. The peak wavelength of the group delay is determined by the angle of incidence on the interferometer, the substrate reflection factor, the amount of phase change of light due to reflection on the coating and the like. It is an objective that the manufacture can be performed in such a manner that all of these amounts conform to the intended design, but if not, the yields will be reduced. For this reason, in order to independently set the angle of incidence on the interferometer with respect to two types of GT interferometers, a structure in which a second mirror, as shown in FIG. 12, is provided between the GT interferometers is conceivable.

The variable dispersion compensator shown in FIG. 12 is composed of: collimators 30 and 31; a first GT interferometer consisting of a plane plate 10, and reflecting films 11 and 12; a second GT interferometer consisting of a plane plate 13 and reflecting films 14 and 15; a first mirror consisting of a substrate 20 and a reflecting film 21; and a second mirror consisting of a substrate 22 and a reflecting film 23. The optical beam emerging from the collimator 30 resonates and is emitted by the first GT interferometer (10, 11, 12) and is reflected by the first mirror (20, 21). This process is repeated several times, the angle of incidence is adjusted by the second mirror (22, 23), and then the optical beam resonates and is emitted by the second GT interferometer (13, 14, 15) and is reflected by the first mirror (20, 21). After this process is repeated several times, the beam becomes incident on the collimator 31. In this figure, the GT interferometer (10,11, 12), the GT interferometer (13, 14, 15) and the mirror (22, 23) are disposed at a slight angle with respect to the first mirror (20, 21), and further, these elements are arranged to oppose each other at respectively different angles, but it may be possible to arrange them to oppose each other in parallel, as described above. When a slight angle is given, as described above, the optical beam emerging from the collimator 30 repeats its resonance while changing the angles of incidence on those two GT interferometers little by little, as shown, whereby a dispersion compensation, which exhibits hardly any group delay ripples in the broad bandwidth, can be realized.

Figure 13:
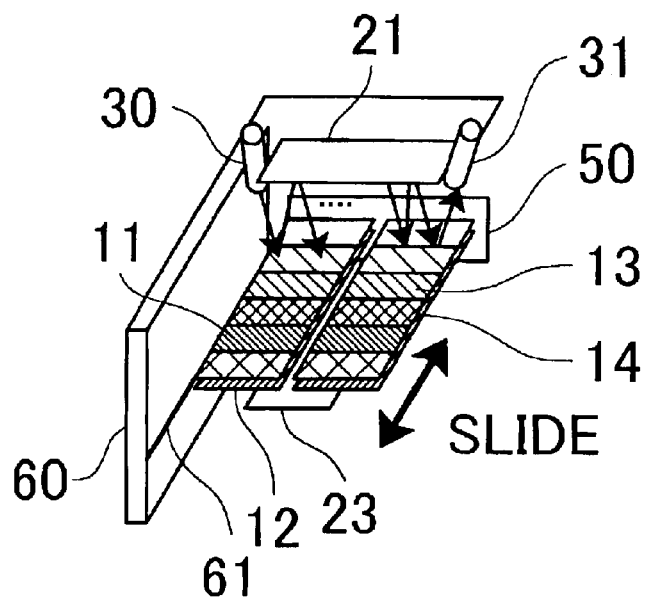
FIG. 13 is a diagrammatic perspective view showing an example of the structure of an optical variable dispersion compensator according to the fifth embodiment of the present invention.

An example of a structure for providing a variable mechanism, based on the concept of FIG. 12, is shown in FIG. 13. The variable dispersion compensator of FIG. 13 is composed of: collimators 30 and 31; a first GT interferometer consisting of reflecting films 11 and 12; a second GT interferometer consisting of reflecting films 13 and 14; a fixed base 50 for fixing those two interferometers; a first mirror consisting of a reflecting film 21; a second mirror consisting of a reflecting film 23; and a fixed base 60 having a guide rail 61. In this case, the reflecting films 11 and 13 have a varying reflection factor and thickness in a direction perpendicular to the direction at which the optical beam emerging from the collimator 30 advances, as indicated by light and shade hatching in the figure, so that resonance and reflection are repeated with the mirror and the two interferometers, that is, in the longitudinal direction. The second mirror consisting of those two GT interferometers and the reflecting film 23 has its angle fixed by the fixed base 50, and it is allowed to slide at the same time in the direction indicated in the figure, whereby the amount of dispersion compensation can be made variable. In order to allow it to slide, the fixed base 60 has a guide rail 61 to guide it in the direction in which the second mirror consisting of those two GT interferometers and the reflected film 23 operates. Also, the fixed base 60 fixes the collimators 30, 31 and the reflecting film 21. In order that a beam emerging from the collimator 30 becomes incident on the collimator 31, the second mirror, consisting of the two GT interferometers and the reflecting film 23, is capable of being moved along the guide rail 61 by means such as a stepping motor without changing the direction of the beam. With such a structure, the variable mechanism of a dispersion compensator, which has hardly any group delay ripples in the broad bandwidth, can be realized.

Figure 14:
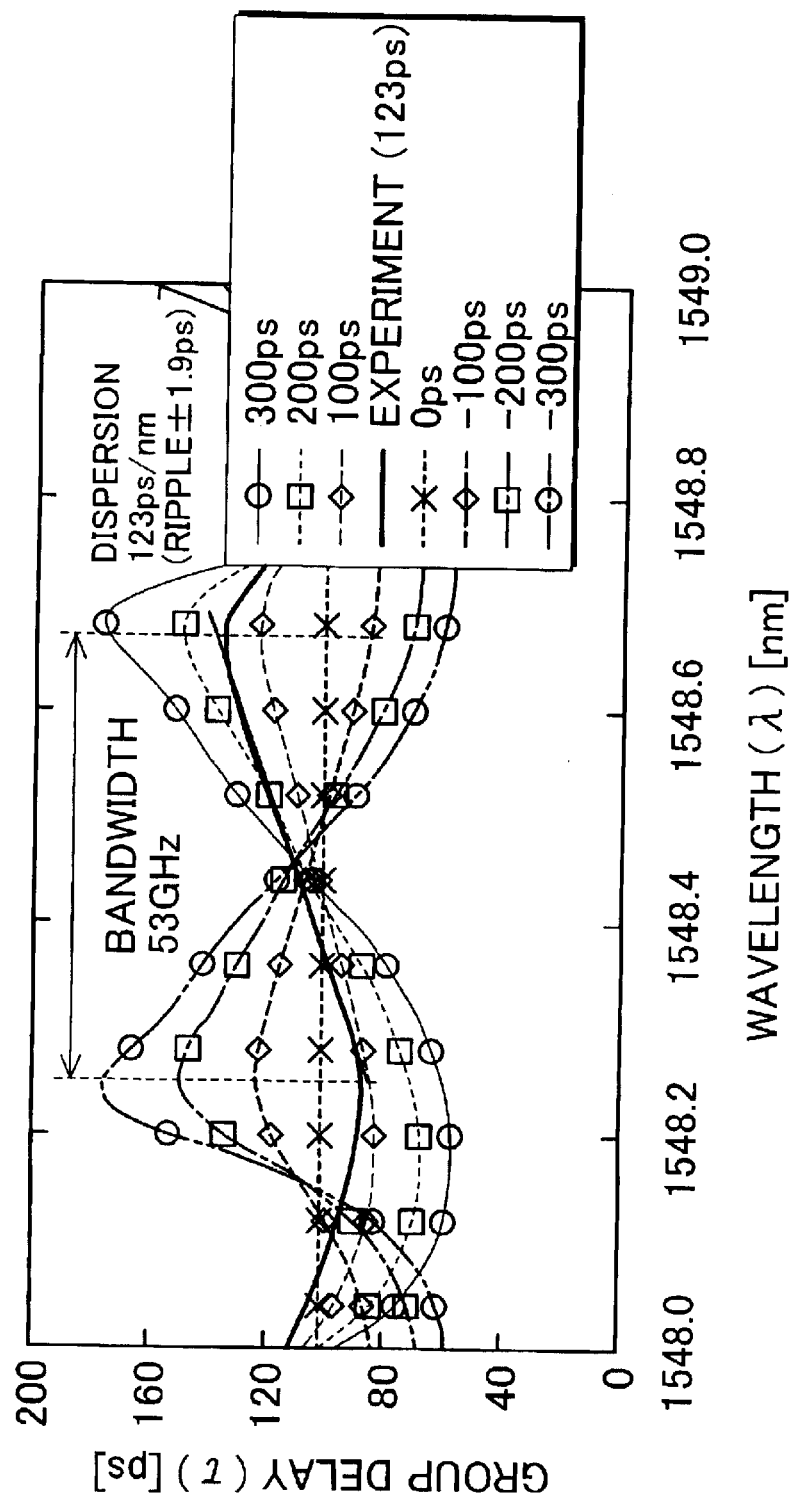
FIG. 14 is a graph showing an example of a first group delay characteristic of an optical variable dispersion compensator according to the present invention.
Figure 20:
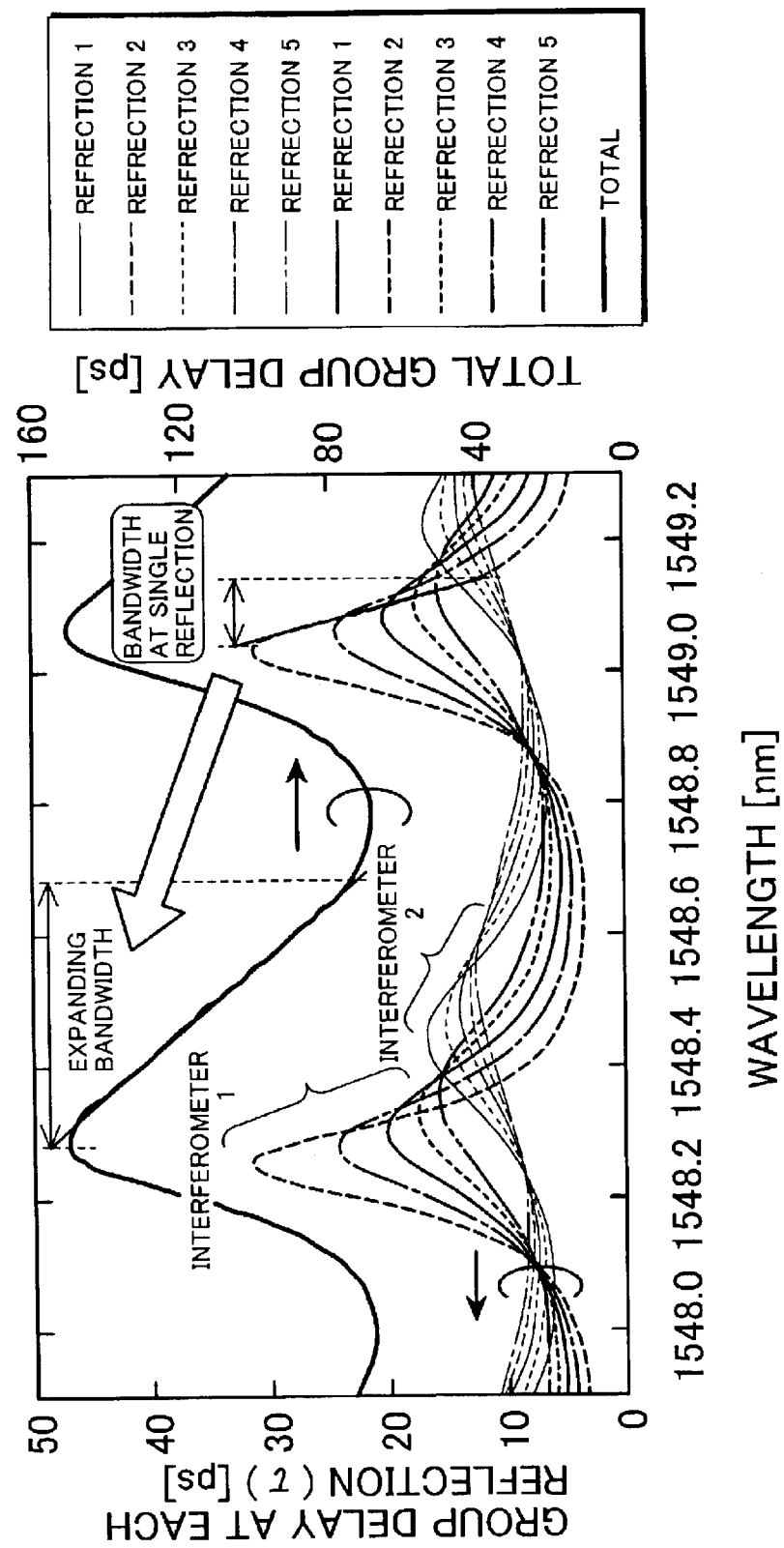
FIG. 20 is a graph showing an example of a third group delay characteristic of an optical variable dispersion compensator according to the embodiment of the present invention.

With such a structure, results obtained by measuring the group delay characteristics by experiment are shown in FIG. 14. The two kinds of interferometers used in this experiment are those having amplitude reflection factors r=40% and 16%. By doing so, characteristics of effective bandwidth 53 GHz, dispersion 123 ps/nm, and ripples 1.9 ps or less have been obtained. An effect of the effective bandwidth being expanded through the use of two kinds of interferometers is shown in FIG. 20. FIG. 20 shows respective group delay caused when resonance has been produced five times with the first interferometer 1, respective group delay caused when resonance has been produced five times with the second interferometer 2 and their total. In this figure, the peak positions of those two interferometers have been adjusted so as to expand the effective bandwidth. Usually, in a WDM transmission system, there is used an optical wavelength (ITU grid) instituted by ITU (International Telecommunication Union) that is an International Organization for Standardization. For this reason, in order to take the effective bandwidth of the dispersion compensator wide and to match the center wavelength with the ITU grid, the angles of incidence of those two interferometers must be independently set. For this setting, the existence of the second mirror consisting of a reflecting film 23 is required. Also, FIG. 14 shows the group delay characteristic when the reflection factors of the interferometers are changed by calculation. From this result, it can be seen that a dispersion compensator having a variable dispersion of −300 ps/nm to +300 ps/nm could be realized.

Figure 15:
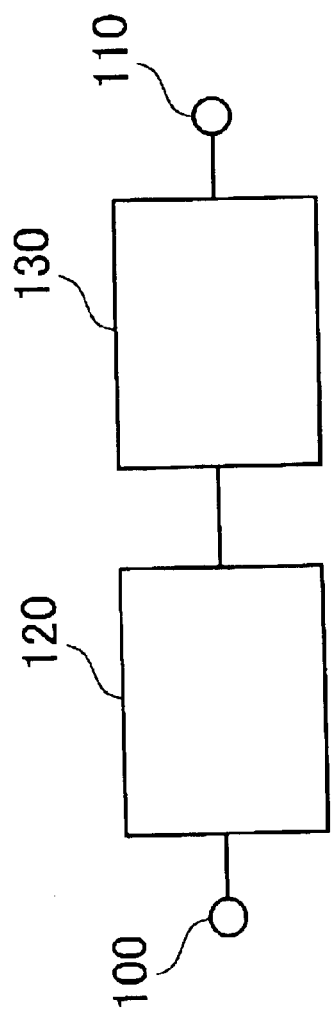
FIG. 15 is a block diagram showing an optical variable dispersion compensator according to a sixth embodiment of the present invention.

As the structure of the variable dispersion compensator, a structure such as shown in FIG. 15 is also conceivable. In this structure, the variable dispersion compensator is composed of: an input port 100; a plus-side variable dispersion compensation unit 120; a minus-side variable dispersion compensation unit 130; and an output port 110. The plus-side variable dispersion compensation unit 120 is a dispersion compensator which gives an amount of dispersion compensation to the plus side from 0. Also, the minus-side variable dispersion compensation unit 130 is a dispersion compensator which gives an amount of dispersion compensation to the minus side from 0. For example, when a plus amount of dispersion compensation is to be given to the dispersion compensator, the amount of dispersion compensation to be given by the minus-side variable dispersion compensation unit 130 is set to 0, and the plus-side amount of dispersion compensation is changed by the plus-side variable dispersion compensation unit 120. Conversely, when a minus amount of dispersion compensation is to be given to the dispersion compensator, the amount of dispersion compensation to be given by the plus-side variable dispersion compensation unit 120 is set to 0, and the plus-side amount of dispersion compensation is changed by the minus-side variable dispersion compensation unit 130.

Since a dispersion compensator according to the present invention has a wavelength periodicity of FSR, as described above, it has been explained that it is possible to collectively dispersion compensate at the time of wavelength multiplex transmission. However, the FSR is slightly shifted together with the wavelength space, whereby it becomes also possible to slightly change the amount of dispersion compensation with respect to a signal for each wavelength. Thereby, it also becomes possible to compensate for the dispersion of a higher order (dispersion slope). Here, the dispersion of a higher order $D_2$ is an amount represented by the following expression obtained by further differentiating the dispersion with respect to the wavelength.

Expression 5

$$D_2 = \frac{dD}{d\lambda}$$

Figure 16:
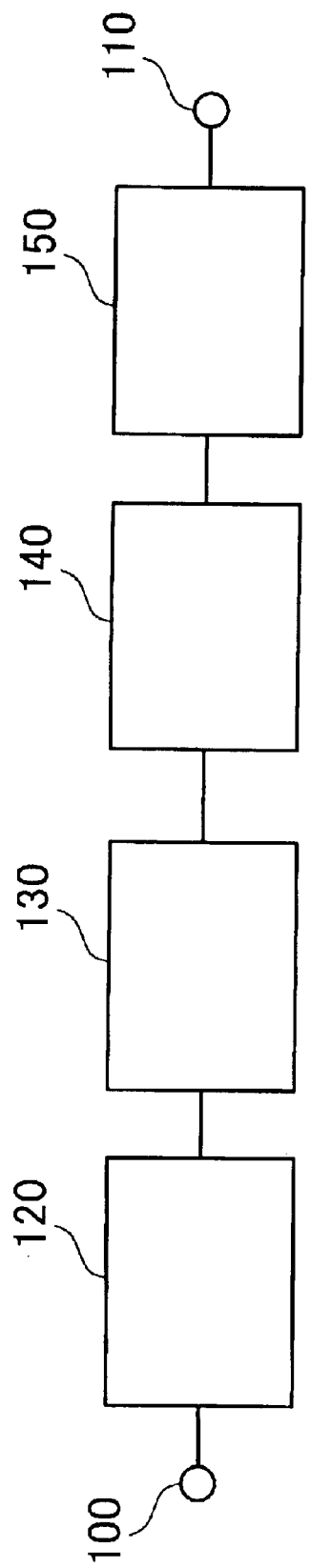
FIG. 16 is a block diagram showing an optical variable dispersion compensator according to a seventh embodiment of the present invention.

The structure of a dispersion compensator capable of compensating for up to such a dispersion of higher order is shown in FIG. 16. In this structure, the dispersion compensator is composed of: an input port 100; the plus-side variable dispersion compensation unit 120; the minus-side variable dispersion compensation unit 130; a plus-side variable higher-order dispersion compensation unit 140; a minus-side variable higher-order dispersion compensation unit 150; and an output port 110.

Figure 17:
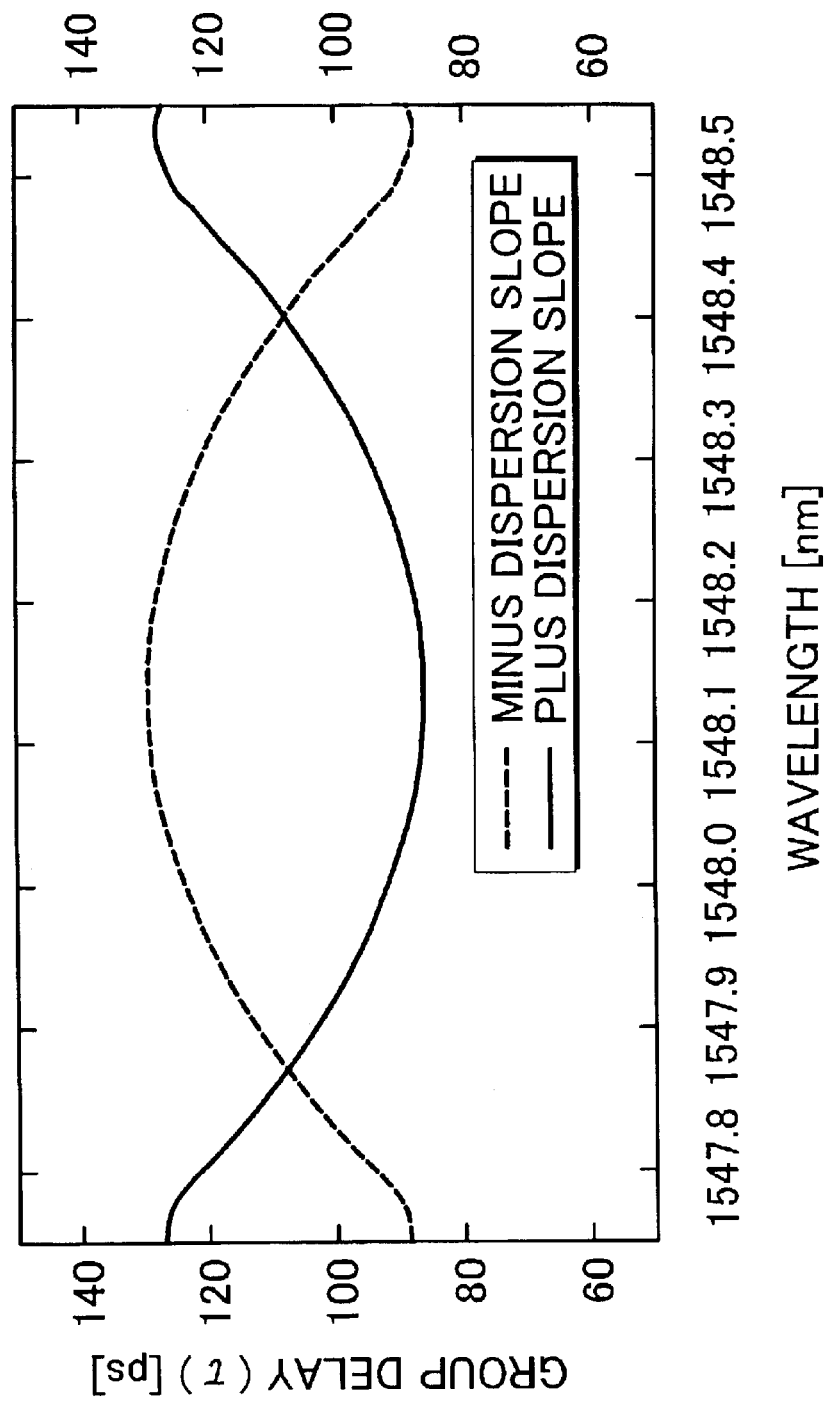
FIG. 17 is a graph showing an example of a second group delay characteristic of an optical variable dispersion compensator according to an embodiment of the present invention.
Figure 18:
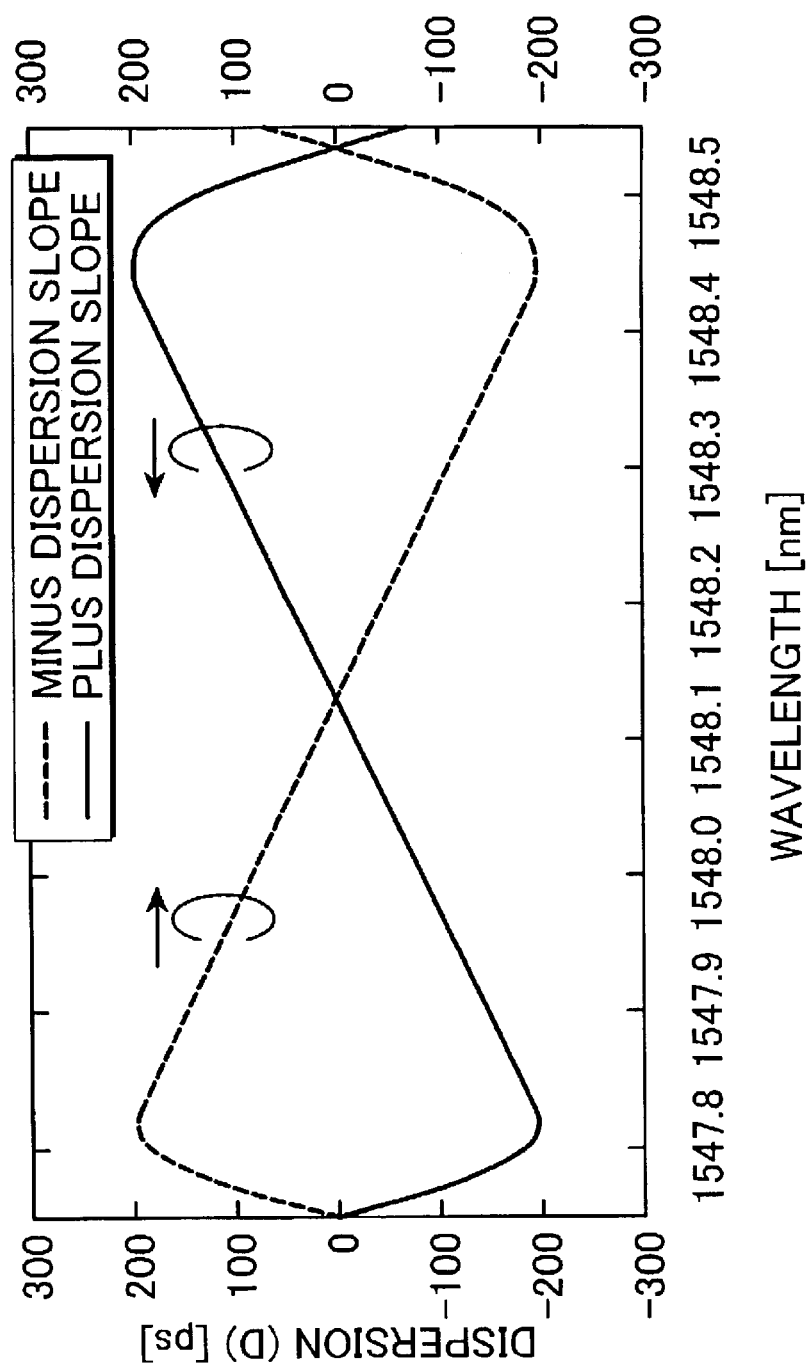
FIG. 18 is a graph showing an example of a wavelength dispersion characteristic of an optical variable dispersion compensator according to an embodiment of the present invention.

With reference to FIGS. 17 and 18, a description will be given of the dispersion as an example of the compensation of higher-order dispersion.

FIG. 17 shows a case where the wavelength dependence of the group delay characteristic becomes nearly a secondary function (parabola), in which the solid line indicates a positive curvature, that is, a positive dispersion slope, while the dashed line indicates a negative curvature, that is, a negative dispersion slope. Further, through the use of the Numerical Formula (2), the wavelength dependence of the amount of dispersion at this time is as shown in FIG. 18. Similarly to FIG. 17, the solid line indicates the positive dispersion slope and the dashed line indicates the negative dispersion slope. As a variable mechanism, the reflection factor and the thickness are changed in the longitudinal direction, as described above; or, by causing the temperature to effect a change through the use of a heater or the like, the amount of dispersion slope can be changed. Also, if there are a pair of higher order dispersion compensators having positive and negative dispersion slopes at the same absolute value, it will be possible to from a dispersion compensator which has hardly any group delay ripples by canceling the higher order dispersions. An example will be described with reference to FIG. 19.

Figure 19:
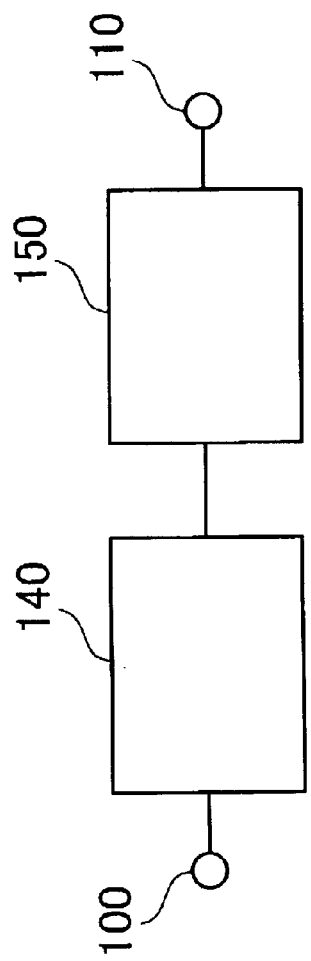
FIG. 19 is a block diagram showing an optical variable dispersion compensator according to an eighth embodiment of the present invention.

In the structure of FIG. 19, the higher order dispersion compensator is composed of: an input port 100; a plus-side variable higher-order dispersion compensation unit 140; a minus-side variable higher-order dispersion compensation unit 150; and an output port 110. For example, when a temperature change due to a heater or the like is used as a variable mechanism of the higher order dispersion compensation unit, the peak of the dispersion shown in FIG. 18 shifts together with the temperature. When shifted in the direction of the arrow shown in FIG. 18 in response to a temperature change, the amount of dispersion of the dispersion compensator becomes positive; and, when shifted in a direction opposite to the arrow, the amount of dispersion of the dispersion compensator becomes negative. The closer the positions of the mutual peaks come, the narrower the effective bandwidth becomes, but it becomes possible to increase the absolute value of the amount of dispersion. With such a structure, it becomes possible to realize a variable dispersion compensator which has hardly any group delay ripples.

As described above, according to the present invention, it is possible to collectively dispersion compensate for each signal light at the time of wavelength multiplex transmission, and to expand the transmission distance in the transmission system. Further, even with respect to higher order dispersion, the dispersion compensation can be performed. Thus, through the use of the dispersion compensator according to the present invention, a single and low-priced optical communication system that has an excellent transmission characteristic can be constructed.

What is claimed is:

1. An optical dispersion compensator, wherein a second plane of a flat plate-shaped interferometer, having first and second planes which oppose each other and a reflecting surface of a mirror, having one reflecting surface, are arranged to oppose one another in parallel, or said second plane and said reflecting surface are arranged obliquely and oppose one another in such a manner that an imaginary plane, including said second plane, and an imaginary plane, including said reflecting surface, intersect in a line or at a point; and wherein
the reflection factor of said first plane is higher than that of said second plane.

2. The optical dispersion compensator according to claim 1, wherein:
the reflection factor of said first plane is 90% and over to 100% incl. and the reflection factor of said second plane is 0% and over to 90% incl.;
the reflection factor of said mirror is 90% and over to 100% incl.; and
the structure is arranged such that an optical beam is caused to become incident from a region between said second plane and said reflecting plane, said optical beam is alternately reflected once, or two or more times, between said interferometer and said mirror, and, thereafter, said optical beam is caused to pass from between said second plane and said reflected plane, whereby one or multiple signal lights having different wavelengths are given wavelength dispersion.

3. The optical dispersion compensator according to claim 2, wherein the structure is arranged such that said second plane of said interferometer has a rectangular shape, at least one of the reflection factor of said second plane of said interferometer and the thickness of said interferometer is changed in a direction toward a side of said rectangular shape, and said interferometer is movable in said direction.

4. The optical dispersion compensator according to claim 2, wherein there is provided temperature adjusting means, positioned adjacent to said interferometer for causing a change in temperature to said interferometer.

5. The optical dispersion compensator according to claim 3, wherein, for said mirror, there are 2n pieces of mirrors (n is a natural number) and for said interferometer, there are 2n pieces of interferometers, and wherein n pieces of plus variable dispersion compensation units having a positive variable dispersion compensation function and n pieces of minus variable dispersion compensation units having a negative variable dispersion compensation function are connected in a multistage arrangement.

6. The optical dispersion compensator according to claim 4, wherein, for said mirror, there are 2n pieces of mirrors (n is a natural number) and for said interferometer, there are 2n pieces of interferometers, and wherein n pieces of plus variable higher order dispersion compensation units having a positive variable higher order dispersion compensation function and n pieces of minus variable higher order dispersion compensation units having a negative variable higher order dispersion compensation function are connected in a multistage arrangement.

7. The optical dispersion compensator according to claim 1, wherein there are a plurality of said interferometers, including at least a first interferometer and a second interferometer, said first and second interferometers have first and second planes, respectively; said second plane of said first interferometer and said reflecting surface are arranged to oppose one another in parallel, or said second plane of said first interferometer and said reflecting surface are arranged obliquely and oppose one another in such a manner that an imaginary plane, including said second plane of said first interferometer, and an imaginary plane, including said reflecting surface, intersect in a line or at a point; and
wherein said second plane of said second interferometer and said reflecting surface are arranged to oppose one another in parallel, or said second plane of said second interferometer and said reflecting surface are arranged obliquely and oppose one another in such a manner that an imaginary plane, including said second plane of said second interferometer, and an imaginary plane, including said reflecting surface intersect in a line or at a point.

8. The optical dispersion compensator according to claim 7, wherein the reflection factor of said first plane of each of said first and second interferometers is 90% and over to 100% incl., while the reflection factor of said second plane of each of said first and second interferometers is 0% and over to 90% incl., and the reflection factor of the reflecting surface of said mirror is 90% and over to 100% incl.; and wherein the structure is arranged such that an optical beam is caused to become incident from a region between said second plane of said first interferometer and said reflecting surface, said optical beam is alternately reflected between said interferometer and said mirror once, or two or more times, and thereafter said optical beam is caused to pass from between said second plane of said first interferometer and said reflecting surface, said optical beam is caused to become incident from a region between said second plane of said second interferometer and said reflected surface, said optical beam is alternately reflected between said second interferometer and said mirror once, or two or more times, and thereafter, said optical beam is caused to pass from between said second plane of said second interferometer and said reflecting surface, whereby wavelength dispersion is given to one or multiple signal light having different wavelength.

9. The optical dispersion compensator according to claim 8, wherein the structure is arranged such that said second, plane of each of said first and second interferometers has a rectangular shape, at least one of the reflection factor of said second plane of said first or second interferometer or the thickness of said first or second interferometer is changed in a direction toward a side of said rectangular shape, and each of said first and second interferometers is movable in parallel in said direction.

10. The optical dispersion compensator according to claim 8, wherein there is provided temperature adjusting means for causing a change in temperature to at least one of said first or second interferometer, said temperature adjusting means being located adjacent to at least one of said first or second interferometer.

11. The optical dispersion compensator according to claim 9, wherein, for said mirror, there are 2n pieces of mirrors (n is a natural number) and for said interferometer, and there are 4n pieces of interferometers, and wherein n pieces of plus variable dispersion compensation units having a positive variable dispersion compensation function and n pieces of minus variable dispersion compensation units having a negative variable dispersion compensation function are connected in a multistage arrangement.

12. The optical dispersion compensator according to claim 10, wherein, for said mirror, there are 2n pieces of mirrors (n is a natural number) and for said interferometer, there are 4n pieces of interferometers, and wherein n pieces of plus variable higher order dispersion compensation units having a positive variable higher order dispersion compensation function and n pieces of minus variable higher order dispersion compensation units having a negative variable higher order dispersion compensation function are connected in a multistage arrangement.

13. The optical dispersion compensator according to claim 7, wherein there are provided a plurality of said mirrors, including at least a first mirror and a second mirror, said first and second mirrors having first and second reflecting surfaces, respectively; and said second plane of said first interferometer and said first reflecting surface of said first mirror are arranged to oppose one another in parallel, or said second plane of said first interferometer and said first reflecting surface of said first mirror are arranged obliquely and oppose one another in such a manner that an imaginary plane, including said second plane of said first interferometer, and an imaginary plane, including said first reflecting surface of said first mirror, intersect in a line or at a point;

wherein said second reflecting surface of said second mirror and said first reflecting surface of said first mirror are arranged to oppose one another in parallel, or said second reflecting surface of said second mirror and said first reflecting surface of said first mirror are arranged obliquely and oppose one another in such a manner that an imaginary plane, including said second reflecting surface of said second mirror and an imaginary plane, including said first reflecting surface of said first mirror, intersect in a line or at a point; and wherein said second plane of said second interferometer and said first reflecting surface of said first mirror are arranged to oppose one another in parallel, or said second plane of said second interferometer and said first reflecting surface of said first mirror are arranged obliquely and oppose one another in such a manner that an imaginary plane, including said second plane of said second interferometer, and an imaginary plane, including said first reflecting surface of said first mirror, intersect in a line or at a point.

14. The optical dispersion compensator according to claim 13, wherein:

the reflection factor of said first plane of each of said first and second interferometers is 90% and over to 100% incl., while the reflection factor of said second plane of each of said first and second interferometers is 0% and over to 90% incl., and the reflection factor of the reflecting surface of each of said first and second mirrors is 90% and over to 100% incl.;

the structure is arranged such that an optical beam is caused to become incident from a region between said second plane of said first interferometer and said reflecting surface of said first mirror; said optical beam is alternately reflected between said interferometer and said mirror once, or two or more times, thereafter said optical beam is caused to pass from between said second plane of said first interferometer and said reflecting surface of said first mirror; and said optical beam is reflected by the second reflecting surface of said second mirror, and then, said optical beam is caused to pass out; and said optical beam is caused to become incident from a region between said second plane of said second interferometer and said first reflecting surface of said first mirror; said optical beam is alternately reflected once, or two or more times, between said second plane of said second interferometer and said second reflecting surface of said second mirror, and thereafter, said optical beam is caused to pass from between said second plane and said reflecting surface of said second mirror, whereby wavelength dispersion is given to one or multiple signal lights having different wavelengths.

15. The optical dispersion compensator according to claim 14, wherein the structure is arranged such that said second plane of each of said first and second interferometers has a rectangular shape, at least one of the reflection factor of said second plane of said first or second interferometer or the thickness of said first or second interferometer is changed in a direction toward a side of said rectangular shape, and each of said first and second interferometers and said second mirror is movable in parallel in said direction.

16. The optical dispersion compensator according to claim 14, wherein there is provided temperature adjusting means for causing a change in temperature to at least one of said first or second interferometer, said temperature adjusting means being located adjacent to at least one of said first or second interferometer.

17. The optical dispersion compensator according to claim 15, wherein, for said mirror, there are 4n pieces of mirrors (n is a natural number) and for said interferometer, there are 4n pieces of interferometers, and wherein n pieces of plus variable dispersion compensation units having a positive variable dispersion compensation function and n pieces of minus variable dispersion compensation units having a negative variable dispersion compensation function are connected in a multistage arrangement.

18. The optical dispersion compensator according to claim 16, wherein, for said mirror, are 4n pieces of mirrors (n is a natural number) and for said interferometer, there are 4n pieces of interferometers, and wherein n pieces of plus variable higher order dispersion compensation units having a positive variable higher order dispersion compensation function and n pieces of minus variable higher order dispersion compensation units having a negative variable higher order dispersion compensation function are connected in a multistage arrangement.

* * * * *